Feb. 23, 1960
R. R. COOK
2,926,032
METHOD OF AND MEANS FOR CHANGING THE
RELATIVE ANGLE OF ROTARY MEMBERS
Filed July 28, 1958
2 Sheets-Sheet 1
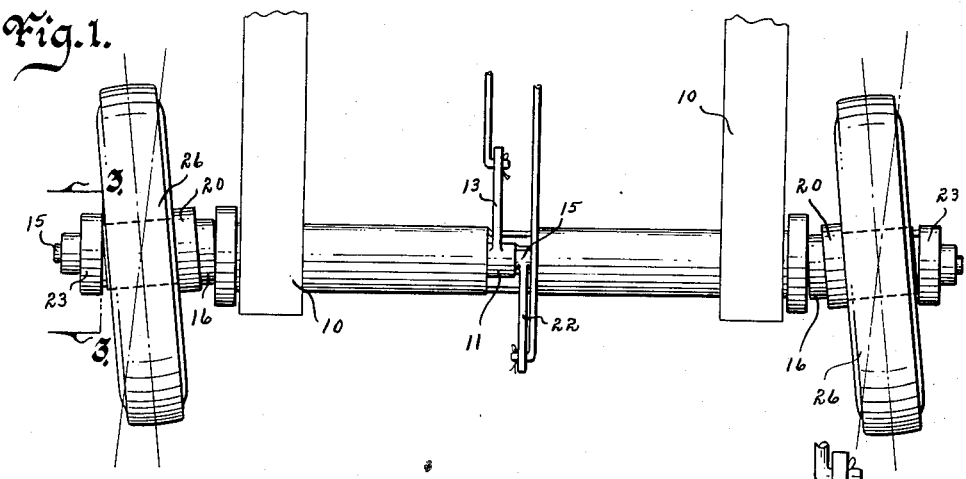
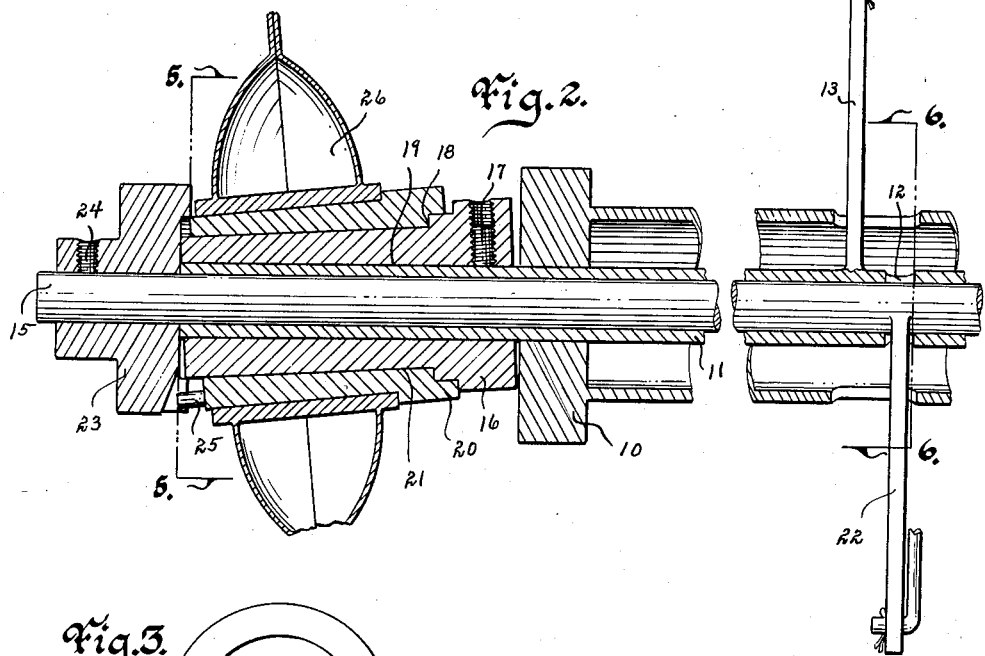
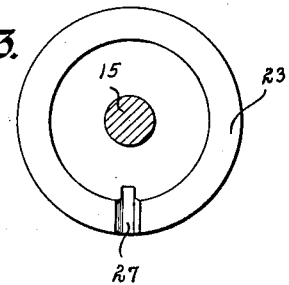
Inventor
Roger R. Cook Feb. 23, 1960
R. R. COOK
2,926,032
METHOD OF AND MEANS FOR CHANGING THE RELATIVE ANGLE OF ROTARY MEMBERS
Filed July 28, 1958
2 Sheets-Sheet 2
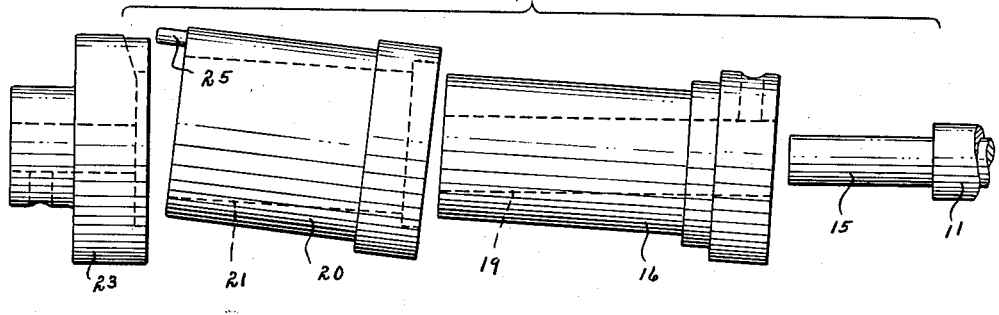
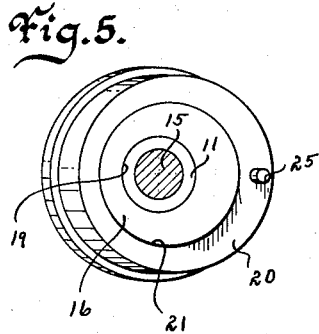
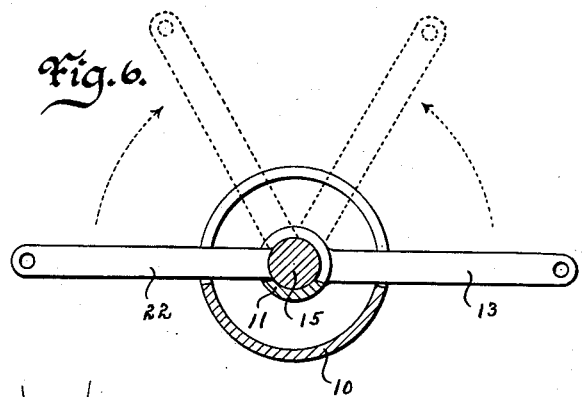
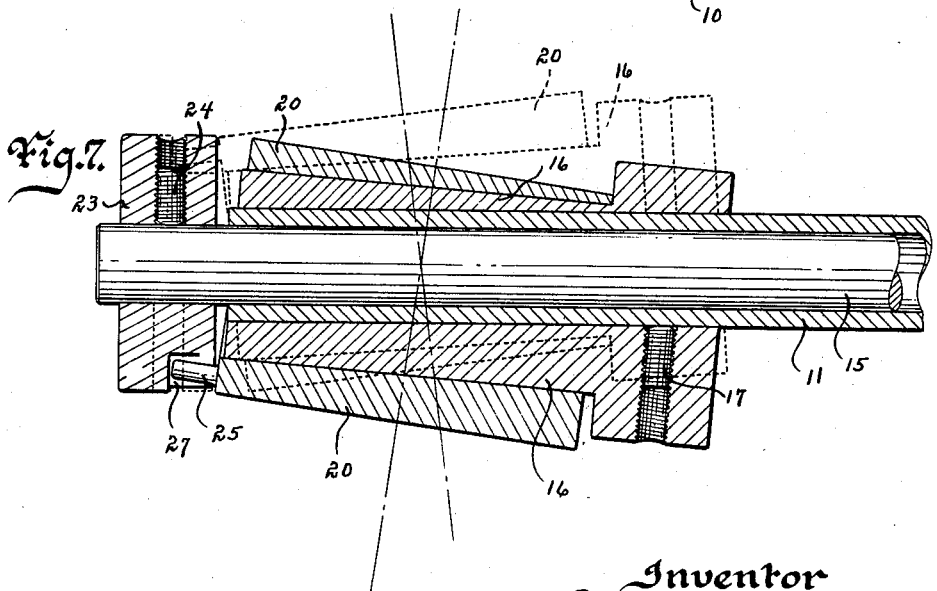
Inventor
Roger R. Cook
by M. Talbert Dick
Attorney
Witness
Edward P. Seeley

United States Patent Office 2,926,032
Patented Feb. 23, 1960

2,926,032

METHOD OF AND MEANS FOR CHANGING THE RELATIVE ANGLE OF ROTARY MEMBERS

Roger R. Cook, Des Moines, Iowa

Application July 28, 1958, Serial No. 751,484

3 Claims. (Cl. 287—52)

This invention relates to a method of and means for changing the relative positions of associated rotary members.

There are many kinds of machines, instruments, equipment, tools and devices that require the adjustable angle positioning of various parts relative to each other. Such necessary adjustments often require a plurality of independent compensating adjustments. In many situations, the means is costly and most difficult of manual manipulation. Also many such devices are highly inaccurate.

Therefore, one of the principal objects of my invention is to provide a mechanical movement that permits the relative angle of the parts to be easily and smoothly changed.

A further object of this invention is to provide a mechanical movement that has a simple, quick positive adjustment.

A still further object of this invention is to provide a mechanical movement for progressively changing relative angles that is always in ratio to its movable adjusting means.

A still further object of this invention is to provide a mechanical movement that is highly accurate and thus capable of use on such devices as leveling means, delicate instruments, gauges and the like.

Still further objects of my invention are to provide a mechanical means that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a top plan view of my device used for illustrative purposes as a steering means for vehicles.

Fig. 2 is an enlarged longitudinal sectional view of one end portion of the device shown in Fig. 1.

Fig. 3 is an enlarged cross sectional view taken on line 3—3 of Fig. 1.

Fig. 4 is an enlarged exploded view of certain of the parts of my invention and more fully illustrates their construction.

Fig. 5 is an enlarged cross sectional view taken on line 5—5 of Fig. 2

Fig. 6 is an enlarged cross sectional view taken on line 6—6 of Fig. 2 and shows the control means, and Fig. 7 is an enlarged longitudinal sectional view of the parts of Fig. 4 in assembled positions.

As hereinbefore indicated, I shall describe my device for purposes of illustration in use as a steering means for wheeled vehicles, it being understood that my device may be used for any equipment needing rapid accurate angle adjustment.

In the drawings, I have used the numeral 10 to designate the chassis of a vehicle. Transversely rotatably extending through its chassis is a hollow shaft 11 having a slot opening 12 in its center length. The numeral 13 designates a radially extending control or adjustment arm. The numeral 15 designates a shaft rotatably extending completely through the hollow shaft 11.

Inasmuch as both ends of the device are duplicates, I shall only describe in detail one end portion, it being understood that like numerals will apply to both ends.

The numeral 16 designates an axle hub adjustably rotatably embracing the hollow shaft 11. A set screw 17 is threaded through the hub 16 and is capable of engaging the shaft 11 for rigidly securing the hub 16 to the hollow shaft 11. This hub has a peripheral shoulder portion 18 on its inner end as shown in Fig. 2. The hub 16 has a cylindrical outer surface, but is unique in that its bore 19 that embraces the hollow shaft 11 extends at an angle to its longitudinal center as shown in Fig. 7. By this arrangement, the bore 19 is concentric with the hollow shaft 11, while the periphery of the hub is centric with the hollow shaft and extends longitudinally at an angle to the hollow shaft.

The numeral 20 designates a second hub portion having a bore 21 that also extends at an angle to its longitudinal center. This bore 21 rotatably embraces the periphery of the hub 18. The bore 21 is therefore concentric with the periphery of the inner hub 16, but the cylindrical periphery of the outer hub 20, when in certain positions of its rotation relative to the inner hub, will be centric with the periphery of the cylindrical periphery of the inner hub 16. This is made possible by the structure of the hub 20 being similar to that of the hub 16. Thus, the two hubs may adjustably complement each other by rotating the hubs relative to each other, i.e., the longitudinal plane of the periphery of the outer hub 20 may be parallel to the longitudinal axis of the hollow shaft 11, or by adjustably rotating the hubs relative to each other, the periphery of the outer hub 20 may be placed at various angles relative to the longitudinal axis of the hollow shaft 11.

Furthermore, the angles may be at each side of the longitudinal axis of the hollow shaft 11. This, of course, is necessary when the device is used for turning the wheels of a vehicle and is illustrated by Fig. 1. Obviously, either of the members 16 or 20 may be rotated relatively to the other to attain desired results. A more rapid action would be to rotate both hubs 16 and 20 simultaneously, but in opposite directions relative to each other. Therefore, the numeral 22 designates a radially extending lever arm on the shaft 15 and extending through the opening 12 as shown in Fig. 2. The numeral 23 designates a cap detachably on the outer end portion of the shaft 15. This cap is rigidly held onto the shaft 15 by the set screw 24.

The numeral 25 designates a lug on the center hub 20 in contact with a slit 27 in the cap 23 as shown in Fig. 3. By this arrangement, when the lever arm 22 is moved, the outer hub 20 will be rotated and when the arm 13 is moved, the inner hub 16 will be rotated. Inasmuch as the hubs 13 and 20 each has a bore extending at an angle to its longitudinal center axis, the eccentrically mounted hubs may at one position of their rotation complement each other to the extent that the periphery of the hub 20 will be exactly parallel with the hollow shaft 11 and shaft 15.

By operating the arms 13 and 22, the periphery of the outer hub 20 may be adjusted to extend outwardly and rearwardly, or adjusted to extend outwardly and forwardly. A wheel 26 may be rotatably mounted around the outer hub 20 as shown in Fig. 2. When my invention is used on vehicles, all four wheels may be steered merely by the movement of the lever arms 13 and 22. All these lever arms may be suitably linked together so that only one control would be necessary to steer all four wheels. By the hubs 16 and 20 capable of complementing each other, and by rotating the hubs simultaneously in opposite directions, the wheel and shafts 11 and 15 will not be lowered or raised relative to the ground surface during the rotating of the hubs 16 and 20. Obviously, if only one hub, i.e. hub 16, or hub 20, were used, this maintaining of shaft elevation would not be possible. Therefore, for most uses, both an inner and an outer hub are necessary.

In the drawings, I have conserved space by not showing roller, nor ball bearing supports.

From the foregoing, it will be appreciated that I have provided an accurate, sturdy and progressive mechanical movement for adjustably obtaining angle positions of rotary members.

Some changes may be made in the construction and arrangement of my method and means for changing the relative angle of rotary members without departing from the real spirit and purpose of my invention, and it is my intention to cover by my claims, any modified forms of structure or use of mechanical equivalents which may be reasonably included within their scope.

I claim:

1. In a mechanical movement device, a hollow shaft, a shaft rotatably mounted in said hollow shaft, an inner hub member having a cylindrical periphery and a bore embracing said hollow shaft; said bore extending at an angle to the longitudinal axis of said inner hub member, a means for securing said inner hub member onto said hollow shaft, an outer hub member having a bore rotatably embracing the cylindrical periphery of said inner hub member; said bore of said outer hub member extending at an angle to its longitudinal axis, and a means for securing said outer hub member to the said shaft that is inside said hollow shaft.

2. In a mechanical movement device, a hollow shaft, a shaft rotatably mounted in said hollow shaft, an inner hub member having a cylindrical periphery and a bore embracing said hollow shaft; said bore extending at an angle to the longitudinal axis of said inner hub member, a means for adjustably securing said inner hub member onto said hollow shaft, an outer hub member having a bore rotatably embracing the cylindrical periphery of said inner hub member; said bore of said outer hub member extending at an angle to its longitudinal axis, and a means for adjustably securing said outer hub member to the said shaft that is inside said hollow shaft.

3. In a mechanical movement device, a hollow shaft, a shaft rotatably mounted in said hollow shaft, an inner hub member having a cylindrical periphery and a bore embracing said hollow shaft; said bore extending at an angle to the longitudinal axis of said inner hub member, a means for securing said inner hub member onto said hollow shaft, an outer hub member having a cylindrical periphery and a bore rotatably embracing the cylindrical periphery of said inner hub member; said bore of said outer hub member extending at an angle to its longitudinal axis, and a means for securing said outer hub member to the said shaft that is inside said hollow shaft.

References Cited in the file of this patent

UNITED STATES PATENTS

| 717,924 | Reid | Jan. 6, 1903 |
| 1,521,428 | Bull | Dec. 30, 1924 |
| 1,819,715 | Le Bret | Aug. 18, 1931 |

FOREIGN PATENTS

| 18,395 | Great Britain | Nov. 18, 1889 |